UNITED STATES PATENT OFFICE.

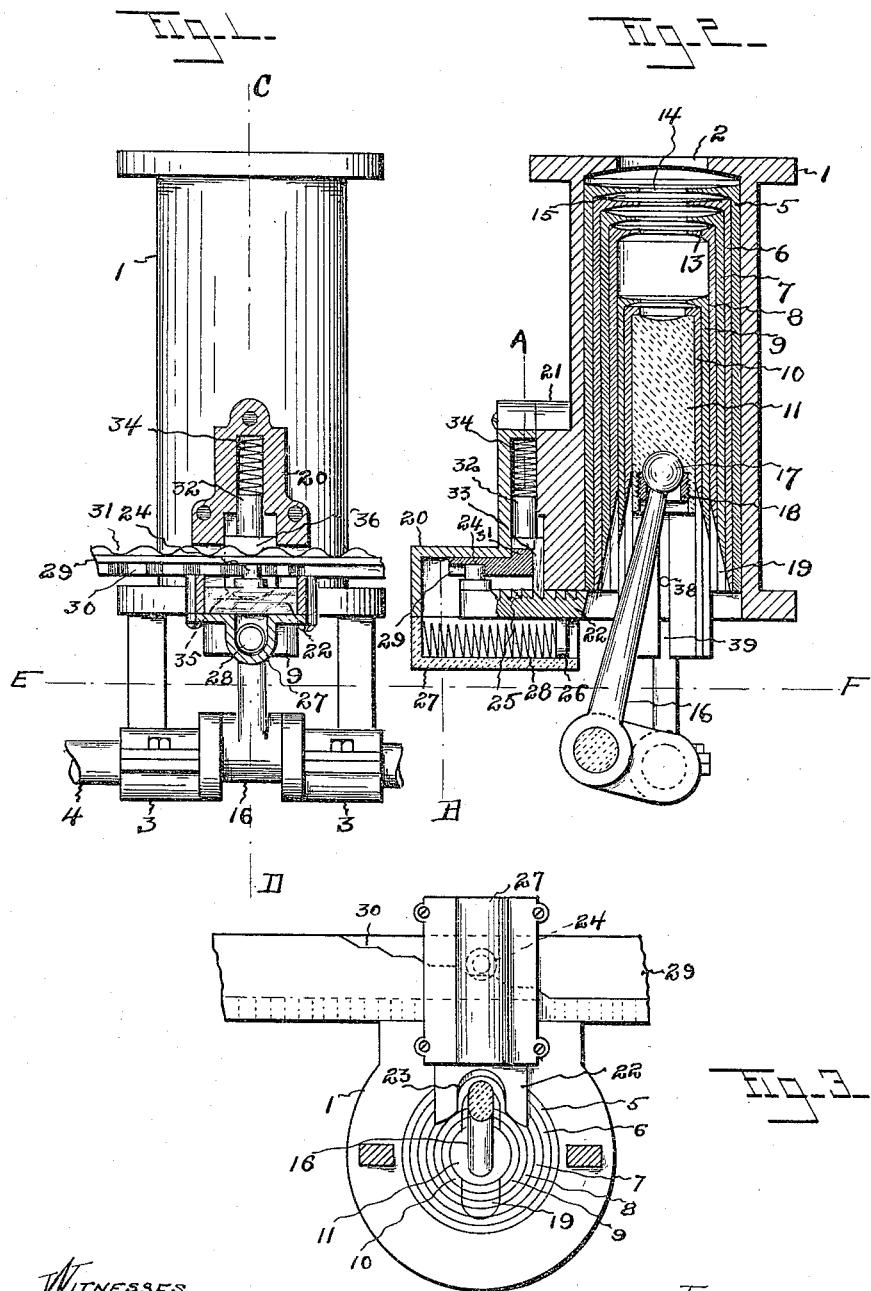

CHARLES A. DREISBACH, OF NEW HAVEN, CONNECTICUT.

MULTIPLE-PISTON DEVICE.

1,165,400.　　　　Specification of Letters Patent.　　Patented Dec. 28, 1915.

Application filed November 6, 1914. Serial No. 870,555.

*To all whom it may concern:*

Be it known that I, CHARLES A. DREISBACH, a citizen of the United States, residing at New Haven, in the county of New Haven and State of Connecticut, have invented certain new and useful Improvements in Multiple-Piston Devices, of which the following is a specification, reference being had therein to the accompanying drawings.

My invention relates to a new and improved mechanism whereby a shaft or other element may be driven at variable speeds and powers through the action of pistons of varying diameters actuated by either a fluid, steam, compressed air, internal combustion, or similar source of power.

It is the object of this invention, among other things, to provide a device that will substantially perform the functions above enumerated, and be composed of the fewest possible parts, so designed that they may be economically constructed, readily assembled, and operate with the minimum wear under the heaviest strains and conditions, without disarrangement of any of the parts or the movements thereof.

To these, and other ends, my invention consists in the multiple piston device, having certain details of construction and combinations of parts, as will be hereinafter described and more particularly pointed out in the claims.

Referring to the drawings, in which like numerals of reference designate like parts in the several figures; Figure 1 is a side elevation of my improved device, partly in section upon line A—B of Fig. 2; Fig. 2 is a sectional view thereof upon line C—D of Fig. 1; Fig. 3 is an enlarged end view with some of the parts upon line E—F of Figs. 1 and 2.

My invention is particularly adapted for use in transmission mechanism for a motor vehicle or similar device, but is not limited thereto, the number of its uses being many, and will readily suggest themselves to those familiar with the art.

In motor vehicle transmission mechanism variable speeds, as well as power must be applied to a driven part from the engine and these within the control of the operator through mechanism that is simple and compact and capable of withstanding the unusually severe conditions of motor vehicle traffic.

In my improved mechanism there is a single cylinder, within which are nested a plurality of pistons, one within the other, the central piston having an operative connection with a crank shaft and the speed and power transmitted to said crank shaft being determined by the piston selected manually by the operator.

In the drawings, the numeral 1 designates a cylinder having a port 2 in one end thereof and housings 3—3 connected with the opposite end thereof within which is journaled a crank shaft 4.

In the drawings I have illustrated a single port 2 in the end of the cylinder, but two or more may be provided if desired. Through this port is admitted either liquid, steam, compressed air, or is connected with an internal combustion engine so that any one of these sources of power may be utilized to operate the pistons.

Any other suitable means for supporting the crank shaft may be used within my invention, the one shown being only one of many forms adapted for the purpose.

Slidably mounted within the cylinder 1 are a plurality of pistons 5, 6, 7, 8, 9, 10, and 11, no two being of the same diameter, and all, except piston 11, being provided with an inwardly projecting head 13, having a central opening 14 therethrough, with the top and bottom sides of the head flaring outwardly from said opening so as to leave an open space 15 between the heads of the pistons for the admission of the liquid, steam, compressed air, etc., by which the pistons may be operated. Each piston, as arranged, serves as a cylinder for the next smaller piston, if both are not in operation. A connecting rod 16 joins the piston 11 with the crank shaft 4, the ball head 17 thereon being held in contact with the piston by the threaded sleeve 18. Each of the cylinders 5 to 10 inclusive is slotted at 19 to permit movement of the connecting rod 16, and is held against rotation by the pin 38 fixed in the cylinder 1 and projects into a slot 39 in said cylinders.

Slidably mounted in the case 20, secured to a lug 21 upon the cylinder, is a release bolt 22, having a notch 23 in its end thereof to permit movement of the connecting rod 16. Projecting laterally from one side of said bolt, near its end, is a lug 24, and in the same side thereof are a plurality of notches 25 for a purpose hereafter to be described.

A spring 28, between the lug 26 on the release bolt 22 and the end of the cover 27, always exerts its tension so as to normally maintain the said bolt in its innermost position toward the axis of the cylinder 1.

Movable within the case 20, by manual means (not herein shown) is a slide 29 having a plurality of steps 30 upon one side thereof, and a plurality of notches 31 in the opposite side corresponding in number with the steps 30. As the slide 29 is moved through the case 20 the lug 24 on the release bolt in the path of the steps 30 is moved toward and away from the axis of the cylinder 1 and carries said release bolt with it against the tension of the spring 28. The stroke of the said slide is such that during the extremes of its movement the release bolt 22 will both cover and uncover the exposed ends of the pistons 5 to 11 inclusive. The release bolt is locked in any of its intermediate positions covering the end of one of the pistons by a lock bolt 32 having a latch 33 connected therewith, which successively projects into the notches 25 upon the release bolt. This lock bolt is normally moved toward the release bolt 22 by a spring 34 within the case 20. The front end of the latch 33 is rounded at 35, as shown by dotted lines in Fig. 1. By reason of this curved end construction, the notches 25 are not cut across the entire width of the bolt 22, which would thereby weaken the bolt. Upon the lock bolt 32 is a lug 36 of substantially the same shape as the notches 31, and which enters said notches and holds the slide 29 against accidental movement. The relative positions of the notches 31 and the steps 30 are such that the bolt 32 is actuated through the lug 36 sufficiently to withdraw the latch 33 from the notches 25, thereby freeing the release bolt 22, before the lug 24 begins to move the same. As soon as the pin 24 rides upon the next succeeding step, either higher or lower than the preceding one, one of the notches 25 is directly in front of the latch 33, which is moved into and registers therewith through the action of the spring 34. At the same time the lug 36 enters one of the notches 31 and locks the slide 29 against accidental movement.

As the release bolt 22 projects across the end of the pistons 5 to 11, inclusive, it is apparent that none of these pistons will operate until said release bolt is moved so as to uncover the end thereof. This is accomplished through the movement of the slide 29, as above described. It is this means of covering and uncovering the exposed end of the pistons that enables me to determine in advance which of the pistons will operate to move the crank, the diameter of the piston determining the speed and power transmitted thereto. Assuming that the source of power passing through the port 2 is maintained at a uniform rate, it will bear against the heads 13, of all of the pistons, including the head of the central piston 12, and will actuate such of the pistons as are not locked against endwise movement by the release bolt 22. If the piston 5 is released and in operation, the speed of movement transmitted to the crank shaft will be less than if only the piston 12 is in operation, but its power will be greater and both of these elements vary in inverse proportion from the largest to the smallest piston. When locked, the innermost of the locked pistons provides a cylinder for the next smaller piston, that is, the one in operation. Suitable oil rings 37 are provided in the pistons for packing and lubricating purposes.

There are minor changes and alterations that can be made within my invention, aside from those herein suggested, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a device of the character described, the combination with a cylinder; of a plurality of pistons nested therein, one within the other; and mechanical means for locking one or more of said pistons against movement in either direction.

2. In a device of the character described, the combination with a cylinder; of a plurality of pistons of substantially uniform diameter throughout their entire length nested therein, one within the other, and each having substantially the same length of stroke and forming a cylinder for the next smaller piston.

3. In a device of the character described, the combination with a cylinder; of a plurality of pistons nested therein, one within the other; a driven element; a connection between one of said pistons and said driven element; and means for mechanically locking one or more of said pistons against movement in either direction.

4. In a device of the character described, the combination with a cylinder; of a plurality of cylinders nested therein, one within the other; and intermeshing means for preventing the rotation of said pistons about their axes.

5. In a device of the character described, the combination with a cylinder; of a plurality of pistons nested therein, and mounted so that each piston is movably mounted within the next larger piston; and means for mechanically locking one or more of said cylinders against movement in either direction.

6. In a device of the character described, the combination with a cylinder; of a plurality of pistons nested therein; means for locking one or more of said pistons against endwise movement; and means for holding said locking means against accidental movement in any of its intermediate positions.

7. In a device of the character described, the combination with a cylinder; of a plurality of pistons nested therein; means for preventing the endwise movement of one or more of said pistons; means for positively moving said locking means in one direction; and means for holding said locking means against accidental movement in any of its intermediate positions.

8. In a device of the character described, the combination with a cylinder; of a plurality of pistons therein; means for locking one or more of said pistons against endwise movement; and cam means for actuating said locking means in one direction.

9. In a device of the character described, the combination with a cylinder; of a plurality of pistons therein; means for locking one or more of said pistons against endwise movement; cam means for actuating said locking means in one direction; and means for locking said cam means against accidental movement.

10. In a device of the character described, the combination with a cylinder; of a plurality of pistons therein; means for locking one or more of said pistons against endwise movement; a cam slide for actuating said locking means; and a bolt for holding said cam slide against accidental movement.

11. In a device of the character described, the combination with a cylinder; of a plurality of pistons nested therein; means for locking one or more of said pistons against endwise movement, said means being positively actuated in one direction by a cam slide; yielding means for moving said locking means in the opposite direction; and a locking member having engagement with said cam slide to prevent the accidental movement thereof.

12. In a device of the character described, the combination with a cylinder; of a plurality of pistons nested therein; a release bolt movable in a path at substantially a right angle to the said pistons and during its movement designed to cover and uncover the ends of said pistons; cam means for moving said release bolt in a direction away from the axis of said pistons; yielding means for moving said bolt in the opposite direction; and a locking member having engagement with the said release bolt and cam mechanism for holding the same against accidental movement.

13. In a device of the character described, the combination with a cylinder; of a plurality of pistons nested therein, one within the other; and means for locking said pistons against movement in either direction when in their nested positions.

14. In a device of the character described, the combination with a cylinder; of a plurality of pistons nested therein, one within the other, each having the same length of stroke from their nested positions; and means for locking one or more of said pistons against movement in either direction.

In testimony whereof I affix my signature in presence of two witnesses.

CHARLES A. DREISBACH.

Witnesses:
  GEORGE E. HALL,
  FLORENCE H. MONK.

Copies of this patent may be obtained for five cents each, by addressing the "Commissioner of Patents, Washington, D. C."